May 25, 1965 G. V. ANDERSON 3,185,815
WELDED STRUCTURE AND METHOD FOR MAKING SAME
Filed July 26, 1962 3 Sheets-Sheet 1
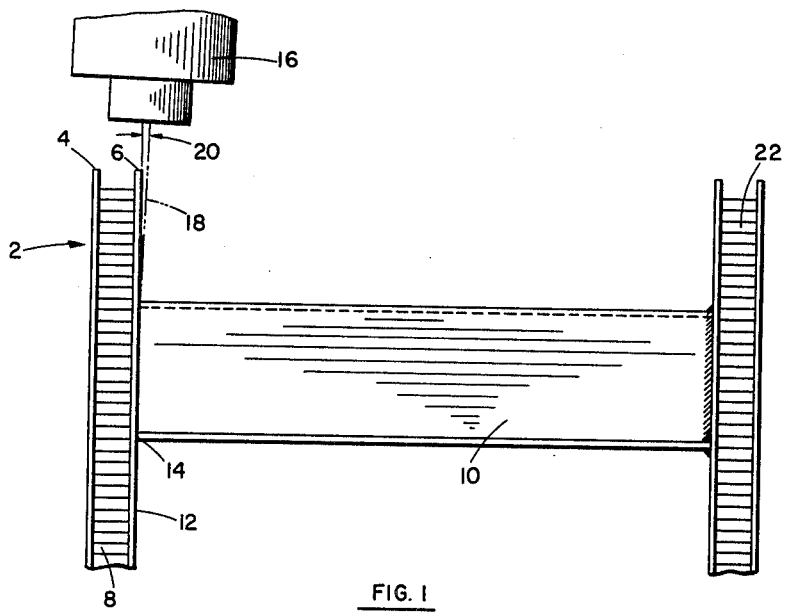
FIG. 1
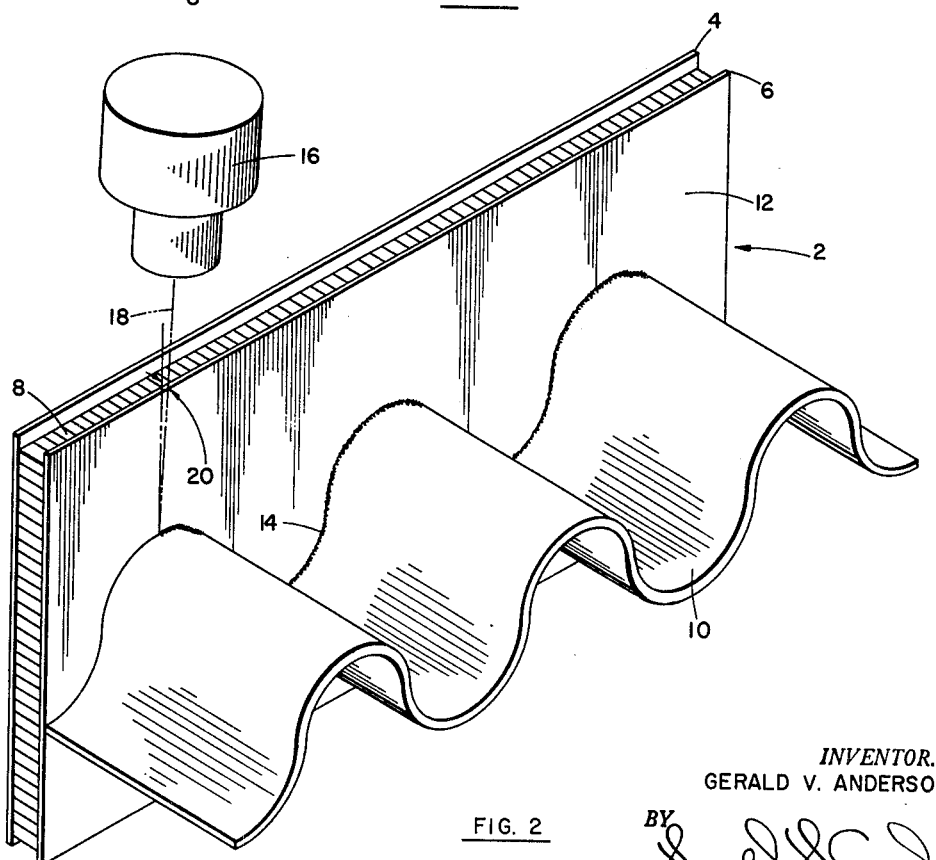
FIG. 2
*INVENTOR.*
GERALD V. ANDERSON
BY 
ATTORNEY May 25, 1965  G. V. ANDERSON  3,185,815
WELDED STRUCTURE AND METHOD FOR MAKING SAME
Filed July 26, 1962  3 Sheets-Sheet 2
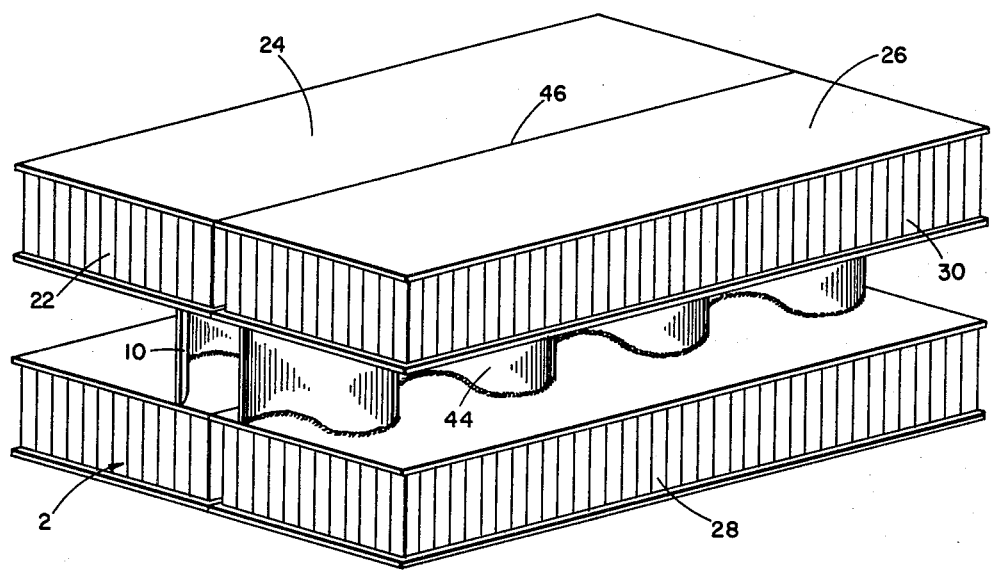
FIG. 3
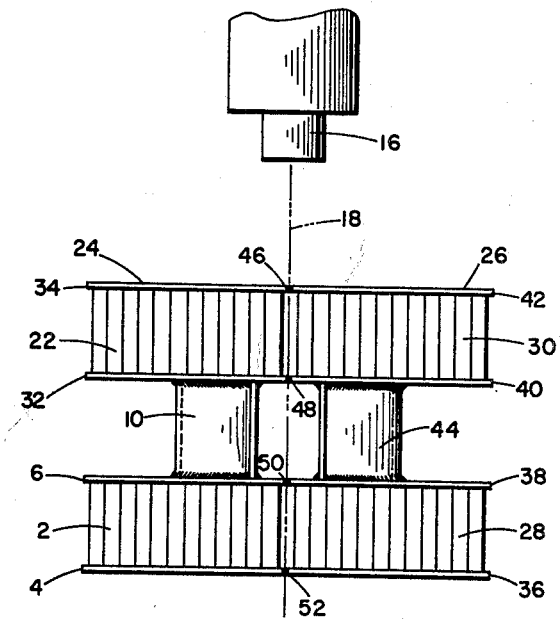
FIG. 4
INVENTOR.
GERALD V. ANDERSON
BY 
ATTORNEY May 25, 1965  G. V. ANDERSON  3,185,815
WELDED STRUCTURE AND METHOD FOR MAKING SAME
Filed July 26, 1962  3 Sheets-Sheet 3
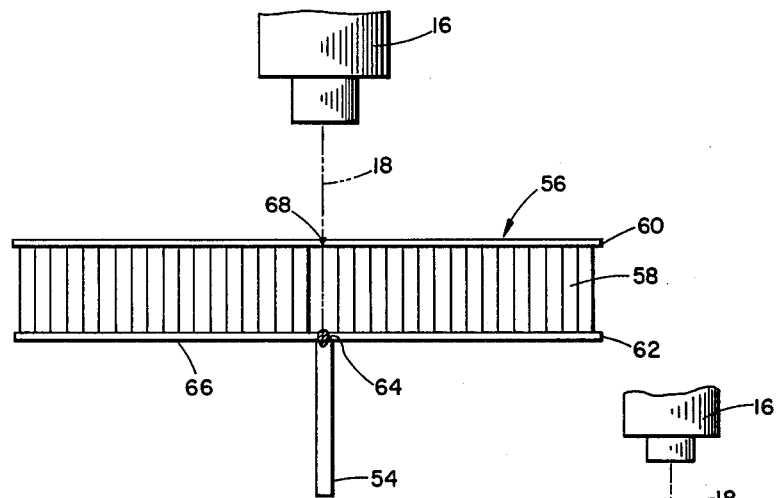
FIG. 5
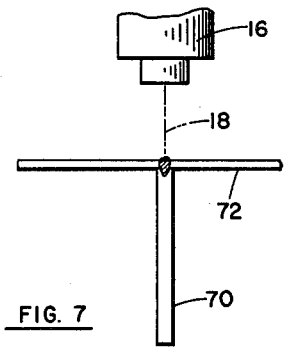
FIG. 7
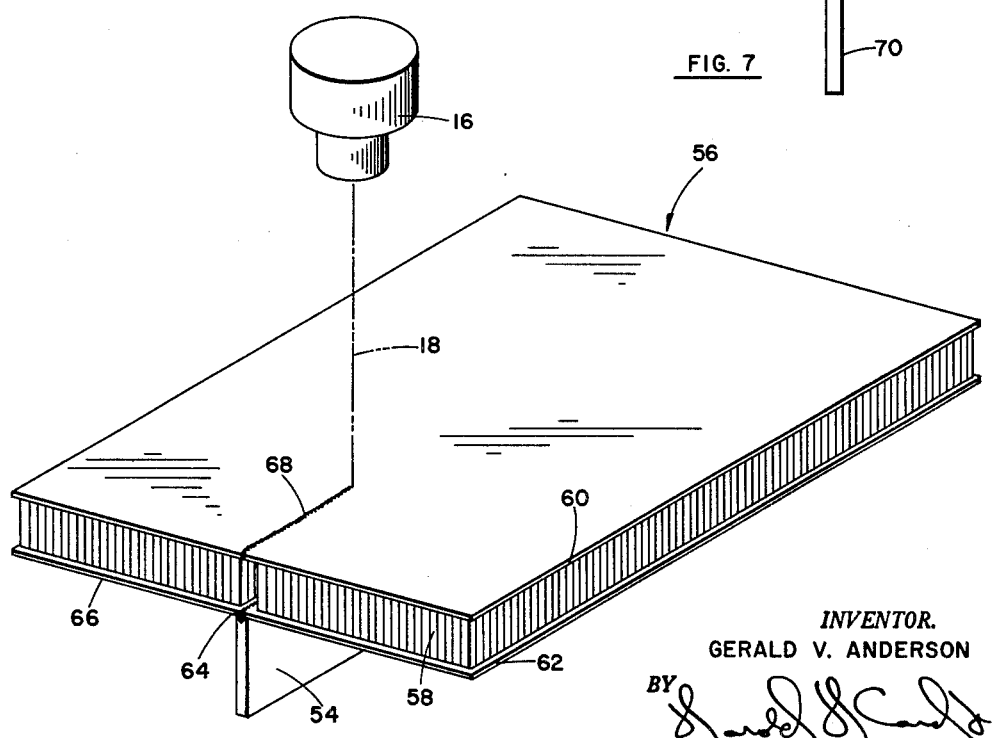
FIG. 6
*INVENTOR.*
GERALD V. ANDERSON
BY 
ATTORNEY

United States Patent Office 3,185,815
Patented May 25, 1965

3,185,815
WELDED STRUCTURE AND METHOD FOR
MAKING SAME
Gerald V. Anderson, Long Beach, Calif., assignor to
North American Aviation, Inc.
Filed July 26, 1962, Ser. No. 212,569
10 Claims. (Cl. 219—137)

This invention concerns an improved technique for the fabrication of lightweight structure involving a plurality of welded joints. More particularly, this invention concerns precision welding by an electron beam to form high strength joints in fabricating structures involving thin-walled components having extreme sensitivity to the application of welding heat. Also, this invention contemplates improved welding techniques in fabricating workpieces of lightweight sheet or panel form, or joinder of members having relatively thin portions such as sheet metal flanges or the like which are welded to other workpiece portions of similar nature.

Although the invention is of wide applicability in fabricating various structures which require joinder of thin-walled components, it will be described for the sake of illustration in connection with welding of lightweight steel panels and channel members of the type modernly used in the fabrication of supersonic aircraft and space vehicles. It will be understood that the scope of the inventive concept is in no sense limited by any of the specific details used to explain the invention, except as determined by reference to the accompanying claims.

Welding of extremely thin gage sheet metal such as mentioned above presents formidable problems not heretofore encountered in the welding art. As in welding generally, the puddle temperature is normally raised much higher than the melting point of the base metal, and some welding heat permeates the base metal surrounding the weld area. Changes such as expansion and shrinkage of the heat-affected area normally results from the welding operation, as well as changes in physical properties such as strength and ductility. Moreover, metallurgical effects such as recrystallization and heat treatment occur due to the application of welding heat. These several effects are particularly emphasized in the case of light or thin-walled members joined to each other by welding, due primarily to the high rate of thermal conductivity of thin metallic sections, causing welding heat to be generally spread over the wide area which produces greater and more uneven expansion during heating and commensurately irregular shrinkage after welding. Also, such members undergo wider variations in unit stress than do larger, heavier members during heating.

The welding problem discussed herein is considerably aggravated in the case of joining multiple edges in a single workpiece where the structure involves use of advanced alloys such as precipitation hardenable stainless steels requiring high welding heat and commensurately deep penetration of the same in the materials to be joined to effect fusion thereof. Illustrative of the stated materials is the alloy commonly designated PH15–7Mo comprised generally of the following components:

| | | |
|---|---|---|
| Carbon | percent | .09 |
| Manganese | do | 1.00 |
| Phosphorous | do | .04 |
| Sulphur | do | .03 |
| Silicon | do | 1.00 |
| Chromium | percent | 14.00 to 16.00 |
| Nickel | do | 6.5 to 7.5 |
| Molybdenum | do | 2.00 to 3.00 |
| Aluminum | do | .75 to 1.5 |
| Iron | | Balance |

The stated precipitation hardenable alloys including PH15–7Mo provide great strength at elevated temperatures, but welding of such materials is accompanied by problems of severe shrinkage during the cooling period following welding of the workpiece. Thus, in joining thin sheets or flanges of advanced alloy steels to each other, elongated ruptures and material failures in the welded area occur frequently during the cooling period after welding. This is primarily because shrinkage of metal in the zone of fusion and the area adjacent thereto causes high residual stress in consequence of the restraining force exerted by the base metal outside the heat-affected area. The weakening and distorting effects of such shrinkage in thin sections of material such as described above are unavoidable and acute.

The welding problems discussed above are abundantly exemplified in connection with lightweight steel panels such as used in supersonic aerial and space vehicles. The stated panels are normally fabricated by brazing a thin face sheet having a thickness on the order of .006 inch, for example, to each side of a slab of metallic core material such as honeycomb foil type having a typical wall thickness on the order of .001 inch. Panels of the stated type are fabricated by brazing the metallic core to the upper and lower face sheets whereby the strength of the panel depends entirely upon continuous and uniform adherence of brazing alloy fillets where the honeycomb cell walls contact each of the face sheet surfaces. Since the brazing alloy used in the stated joints necessarily has a melting temperature or liquidus below the melting temperture of the base metal in the core and face sheets, the application of welding heat to fuse together the face sheets of two panels by conventional means usually melts the brazing alloy fillet in an area corresponding generally to the welding path and having a width coinciding generally with the heat-affected zone. The heat-affected zone is that area containing the base metal which undergoes significant metallurgical changes due to heating effects of welding. The strength of the base metal is seriously impaired by welding heat in the stated area which normally comprises a strip on either side of the weld seam and proximate thereto.

Inability of the mass to dissipate welding heat in the joinder of thin or light workpieces results in acute residual stress in such workpieces. Residual stress is caused by shrinkage during coolant of molten metal in the heat-affected zone, and by phase transformation of the granular structure in the base metal beyond the area of the weld. The residual stress resulting from each individual weld seam results in the application of forces in many different amounts and in non-uniform directions whereby some of the stress resulting from each weld may be canceled or counterbalanced by stresses resulting from other welds or may combine therewith to produce cumulative stresses depending upon the direction involved in each case. The amount and direction of residual stresses resulting from each weld seam depend partly upon the amount of welding heat applied to the workpiece material, the rate of cooling in such material after welding, the distribution of mass in the workpiece components, and the properties of the workpiece material. Residual stresses cause distortion or actual separation of workpiece material along lines generally parallel and proximate the weld seam.

Accordingly, it is a general object of this invention to provide improved joinder of workpiece components characterized by thin-walled construction.

It is also an object in this case to provide an improved welded connection between workpiece components involving a plurality of weld joints.

It is a further object of this invention to provide improved joinder between workpiece components involving a plurality of weld seams wherein the material in such components have a particular tendency to expand and to shrink upon the application of welding heat or upon cooling after welding.

It is also an object in this case to provide an improved method for welding.

It is an additional object in this invention to provide an improved method for forming a welded joint between an edge of a thin sheet metal element and a surface of another such element.

It is also an object in this case to provide a method of welding thin gage metal sections generally arranged to simulate a T or L-shaped cross-section.

It is a further object in this case to provide a method for welding at locations on a workpiece obscured by surfaces which prevent access to such locations by welding equipment.

Other objects and advantages will become apparent upon a close reading of the following detailed description of an illustrative embodiment of the inventive concept, reference being had to the accompanying drawings wherein:

FIGURE 1 shows an elevational view, partly in cross-section, of two workpiece components being joined according to the novel teachings in this case, FIGURE 2 shows a perspective view of the structure shown in FIGURE 1, FIGURE 3 shows a perspective view of a few lightweight honeycomb sandwich type panels arranged for joinder by the novel method disclosed herein, FIGURE 4 shows an elevational view of the structure shown in FIGURE 3, FIGURE 5 shows an elevational view of a joint differing from those shown in FIGURES 1-4 being fabricated according to the novel method taught herein, FIGURE 6 shows a perspective view of the structure of FIGURE 5, and FIGURE 7 shows an end elevational view of a joint formed in accordance with the novel method disclosed herein.

Referring to FIGURE 1, the structure shown may be seen to include a steel panel 2 of the type described above and used extensively in the fabrication of modern aerial and space vehicles. Panel 2 comprises face sheets 4 and 6 joined to the opposite sides of lightweight core material 8 which may illustratively be of honeycomb foil construction secured to the face sheet by conventional brazing or other joinder processes. In making parts from panels such as panel 2, it is occasionally necessary to join structural members to the outer panel surfaces, an example of which is indicated in FIGURE 1 by sinusoidal sheet metal element 10, one edge of which is shown contacting surface 12 of face sheet 6. Where elements 6 and 10 are of extremely thin gage steel, and arranged in simulated T or L-shaped relationship in cross-section, the only known method for welding thereof until discovery of the novel technique disclosed herein was the joinder method described in U.S. Patent No. 3,012,130 to J. R. Harrison, issued December 5, 1961. However, use of the technique taught by U.S. Patent 3,012,130 in fabricating the structure shown by FIGURE 1 of the instant case would require joinder of element 10 to face sheet 6 in the relationship shown by FIGURE 1 prior to brazing of panel 2, since the application of welding heat would otherwise melt the brazing alloy and cause separation of core material 8 from one or both of face sheets 4 and 6. Due to the fact that permanent joinder of elements 6 and 10 prior to fabrication of panel 2 would obviously complicate the brazing procedure by reason of the interference offered by element 10 with respect to non-uniform mass distribution which affects brazing alloy performance, and irregular shape which involves use of special retorts and/or jigs for the brazing operation.

The novel method disclosed herein is applicable to joinder of an edge of one thin sheet-like member, either planar or non-planar in shape, to a surface of another member which may have greater or less thickness than the edgewise member joined thereto, and may be of panel construction or plain sheet form. However, in the illustrative example of FIGURES 1 and 2, element 10, of corrugated or undulating form, is shown being joined to surface 12 of honeycomb panel 2 described above. In effecting the stated joint, element 10 is arranged in desired final relationship with respect to panel 2 so that an edge 14 of element 10 is in contact with surface 12 of face sheet 6 of the panel after the brazing or other fabrication processes for panel 2 have been completed. With the workpiece components in the stated relationship, which in this case is illustratively substantially perpendicular to each other, an electron beam source 16 is positioned with respect to the workpiece whereby an electron beam 18 originating from the stated source is focused at about the midpoint of the high and low peaks formed by the sine wave shape of element 10, and intersecting the line of contact between edge 14 and surface 12 as shown by FIGURE 1. As seen from the stated figure, source 16 is situated with respect to workpiece components 2 and 10 whereby electron beam 18 is almost coplanar with surface 12, but makes a slight angle with respect to surface 12 as indicated by reference numeral 20 in FIGURE 1. Angle 20 may advantageously be from 1/10° to 5° and a value of 2° in the case of workpiece components similar to members 2 and 10 has been found a useful optimum. The angle 20 thus initially established between electron beam 18 and surface 12 is continuously maintained while relative movement occurs between source 16 and the stated workpiece components so that beam 18 traverses a linear path as required to produce a welded joint along the line of contact between surface 12 and edge 14. Fillet welding in the manner described above cannot be accomplished with conventional welding heat sources such as tungsten electrodes where workpieces are of thin-walled construction as in the instant case, since the workpiece material is eroded, consumed by oxidation or otherwise damaged by application of welding heat. Where the workpiece is non-planar in form, and where electron beam source 16 has a fixed or very narrow range of focal lengths, the stated translational movement between source 16 and workpiece components 2 and 10 is required to include appropriate vertical movement either of source 16 or the stated workpiece components whereby the weld location is maintained at a substantially constant distance from the beam source during welding along the undulating line of contact between surface 12 and edge 14. However, it is an important feature of the inventive concept in this case that the stated relative movement as required to maintain a constant distance between the weld location and source 16 is avoided in the case of non-planar members such as member 10 by the novel method disclosed herein. Thus, use of an electron beam source having sufficient power whereby welding may be accomplished over an operative range sufficient to accommodate the differences in height and depth resulting from the sinusoidal shape of member 10 results in continuous welding throughout changes in the stated distance. Where source 16 is of sufficient power, welding by beam 18 may be continuously accomplished over a range of distances between the beam source and the weld location rather than at a single distance when necessary. Since the joint defined by the line of contact between surface 12 and edge 14 is substantially straight when seen from a vantage point coinciding with the line of emittance of electron beam source 16, only linear relative movement between the source and the workpiece is necessary for seam welding even when member 10 is of corrugated form, and the allowable depth of focus of beam 18 will allow welding over a varying height with no detrimental effect on weld quality and no adjustment of beam focal length will be necessary during the welding process. Where desirable or necessary, filler material in suitable form such as wire may be preplaced adjacent the welding path and proximate the line of intersection between surface 12 and edge 14 to facilitate formation of a fillet in the stated location.

Following completion of welding to join panel 2 and element 10 in the relationship shown by FIGURES 1 and 2, the stated process may be repeated to join element 10 to another panel 22 of similar construction to panel 2 whereby a workpiece component comprising two generally parallel and spaced-apart panels will result. Two similar components 24 and 26 such as obtainable by the process discussed above are shown in FIGURE 3 arranged for joinder in a relationship illustrative of the novel principles taught herein. Thus, workpiece component 24 comprising panels 2 and 22 may be seen in close juxtaposition with component 26 comprising panels 28 and 30. Panel 22 comprises face sheets 32 and 34 with core material sandwiched therebetween, while panel 28 comprises face sheets 36 and 38, and panel 30 comprises face sheets 40 and 42. Panels 28 and 30 are secured in constant spaced-apart relationship by undulating sheet metal element 44 corresponding in shape and function to element 10 previously described. In forming structure requiring joinder of workpiece components 24 and 26 in the relationship shown by FIGURE 4, it may be seen that conventional methods of joinder would involve great difficulty due to the limited clearance between members 10 and 44 and between the two spaced-apart panels joined to each of the two stated members. Moreover, the particular heat-sensitive qualities of thin-walled components as discussed above presents very great problems insofar as welding by conventional means is concerned.

The inventive concept in this case avoids problems otherwise arising from the difficulties discussed above by welding together components 24 and 26 at the location of the face sheets by simultaneously welding together all eight face sheets from a source of welding heat situated external of the entire workpiece and on one side thereof. Thus, as shown by FIGURE 4, electron beam source 16 is situated above the workpiece and arranged with respect thereto so that beam 18 is initially directed along a line coinciding with the plane of intersection defined by the contacting edges of the eight face sheets to be joined. With the relationship thus initially established, and assuming that source 16 has the focal length characteristic described in detail above, beam 18 is thereafter moved relative to the workpiece along a welding path coinciding with the stated plane of intersection and simultaneously welds all four joints designated by reference numerals 46, 48, 50 and 52. In practicing the stated method, use of a beam source having sufficient power to permit welding within a range of distances from the source coinciding with the total height of workpiece components 24 and 26 is desirable. In addition, it has been found that welding of face sheets 32 and 40, for example, may be accomplished by beam 18 even when a seam such as 46 is not situated above seam 48. Thus, beam 18 will penetrate the surface of face sheet 34 and accomplish welding of face sheet 32 even without an abutting line of contact between face sheets 34 and 42. In such a case, the beam pierces face sheet 34 and makes a weld seam along the surface as the beam progressed along the welding path.

Referring to FIGURES 5 and 6, application of the novel method disclosed herein may be seen in the edgewise joinder of a substantially planar thin sheet member 54 to a light weight panel 56 similar in construction to panel 2 described above. Panel 56 comprises a core section 58 which may illustratively be of honeycomb foil type sandwiched between face sheets 60 and 62. In the illustrative example of FIGURES 5 and 6, member 54 is preplaced with an edge 64 thereof in substantially continuous contact with a surface 66 of panel 56 to which member 54 is sought to be joined. With the workpiece components 54 and 56 in substantially perpendicular relationship as shown by FIGURES 5 and 6 and described above, electron beam 18 is directed from source 16 above the assembled components so that beam 18 pierces face sheets 60 and 62 and applies heat directly to edge 64, fusing the same to face sheet 62. Use of the method illustrated in FIGURES 5 and 6 requires that beam source 16 have the focal length characteristic described hereinabove which permits welding at a plurality of locations along the beam length. Thus, beam 18 pierces face sheets 60 and 62 of panel 56, and during relative translational movement between source 16 and workpiece components 54 and 56, causes a weld seam such as indicated by reference numeral 68 in FIGURE 6 to be formed in each of face sheets 60 and 62 even although either or both face sheets may be of unitary form not involving abutting planes of contact. However, it will be understood that, where face sheets 60 and 62 are not of unitary construction, welding of the same along a plane of abutting contact betwen face sheet portions in the manner discussed above in connection with face sheets 32–42, inclusive, may be accomplished simultaneously with joinder of member 54 to the lower face sheet 62 of panel 56.

A slight variation in the edgewise joinder of thin flanges or sheet-like members to surfaces in the general manner shown by FIGURES 5 and 6 may be seen from FIGURE 7. In this figure, relatively thin member 70 is preplaced with an edge thereof contacting a surface of another member 72. Thereafter, electron beam 18 is directed at the contacting edge of member 70 from source 16. Source 16 is located on the side of member 72 opposite that contacted by member 70 so that beam 18 must pierce through member 72 to reach the stated edge. Thus, member 72 in FIGURE 7 is a unitary sheet, strip or the like, to which strip or sheet-like member 70 is joined in the general manner necessary to form T or L-shaped channel members or various other objects. In the case of L-shaped joints, it will be understood that the same principle of penetrating one portion of the workpiece by an electron beam to apply heat to the edge of the other workpiece portion applies whether the leg of the L is secured to a surface of the base portion or whether an edge of the leg portion is secured to the surface of the leg portion.

From the description set forth above, it may be seen that the invention disclosed herein provides novel means to permit welding at locations which would otherwise be inaccessible and in situations where welding would be impossible by conventional methods and apparatus. Moreover, application of the inventive method described above in joining lightweight workpiece components of thin-walled construction provides improved joints characterized by greater strength and substantially less distortion than that normally encountered in welding workpieces of the stated type. In addition, the simultaneous welding of such workpieces along a plurality of seams results in simultaneous application of heat followed by simultaneous cooling along each of the stated seams whereby differential shrinkage effects are avoided. Also, in connection with fabrication of workpieces requiring edgewise joinder of thin-walled components to a surface such as exemplified by joinder of member 10 to surface 12, when the member is planar instead of undulating in form and the surface is a plain sheet not forming part of a panel, the novel method illustrated by FIGURES 1 and 2 has been found to produce strong, reliable and distortion free joints. Where brazed panels are involved such as panel 2, it has been found that weakening of the panel structure does not result from the welding process because beam 18 does not liquify the brazing alloy securing the core section to the panel face sheets in the area adjacent the weld.

While the particular details set forth above and in the drawings are fully capable of attaining the objects and providing the advantages herein stated, the structure and method thus disclosed are merely illustrative and could be modified or varied to produce the same results without

I claim:

1. A method of simultaneously welding along a plurality of co-planar and spaced-apart weld seams in a plurality of surfaces comprising:
    directing an electron beam through each of said surfaces, and
    moving said beam relative to said surfaces along a path defining said seams.

2. A method of welding together two members each having at least two spaced-apart co-plannar distal edges whereby a first point is formed between a first confronting pair of said edges and a second joint is formed between a second confronting pair of said edges, said method consisting of:
    directing an electron beam between said first and said second confronting pairs of edges and
    moving said beam relative to said members along a path defining said first and second points.

3. A method of welding together two workpiece components each having a lightweight core of relatively low density material and a face sheet of greater density than said material affixed on either side of said core, said method comprising:
    preparing a marginal edge on each of said face sheets on each said component whereby said marginal edges on one said component have a contour oppositely corresponding to the contour of said prepared marginal edges on the other of said components,
    placing said two components adjacent each other with said prepared edges of said face sheets of said components in confronting relationship and substantially continuous contact in the area to be welded, and
    simultaneously effecting two weld joints between said face sheets on opposite sides of said components by directing an electron beam between said contacting edges and translationally moving said beam along a path coinciding with said contours.

4. The method of welding together two workpiece components each having a plurality of spaced-apart distal edges whereby a plurality of joints is formed between said two components, said method consisting of:
    preparing said confronting pairs of edges on each of said components whereby close and substantially continuous contact occurs therebtween along the portion of said confronting pairs of edges to be welded, and whereby said contact occurring between each pair of said confronting edges is coplanar with said contact occurring between the remaining confronting pairs of edges,
    placing said two members adjacent each other in the desired final relationship,
    operatively relating an electron beam source to said workpiece, said source being capable of emitting a beam having a focal length characteristic permitting welding by said beam in a plurality of locations along said beam, and
    progressively and simultaneously welding said confronting pairs of edges by directing said beam between said confronting pairs of edges and translationally moving said beam along a path coinciding therewith.

5. In a method of joining an edge of a first thin metallic member to a surface of a second thin metallic member by fusion therebetween:
    placing said edge in contact with said surface,
    directing an electron beam at the line of intersection between said edge and said surface,
    said beam being proximate said surface and angularly displaced therefrom, and
    translating said beam along a path substantially coinciding with said line of intersection to fuse together said edge and said surface.

6. The method set forth in claim 5 above wherein:
    said first member is non-planar in shape,
    said edge appears linear in side profile,
    said beam is capable of welding at a plurality of locations along its length, and
    said angularity between said beam and said surface comprises a relatively small angle.

7. The method set forth in claim 6 above wherein:
    said first member is of corrugated sheet form.

8. The method set forth in claim 7 above wherein:
    said second member is a lightweight panel of sandwich type construction.

9. A method for forming a connection between a first member of panel form having at least two spaced-apart face sheets with confronting inner surfaces and oppositely facing external surfaces, and a second member of thin sheet form, said method comprising:
    placing an edge of said second member in contact with one of said external surfaces on said first member whereby said first and second members are mutually related in substantially right angle relationship, and
    directing an electron beam through the other external surface opposite from said one external surface of said first member and aligned with said contacting edge so that welding heat is applied by said beam to join together said first and second members in said relationship.

10. A method of joining together two lightweight steel panels of sandwich-type construction, each having a lightweight core with a face sheet affixed to said core on opposite sides thereof, and a metallic sheet, said method comprising:
    arranging said panels in close contacting relationship whereby a portion of the edges on the face sheets of one said panel is in close and substantially continuous contact with a corresponding edge portion of the edges of said other panel,
    placing said sheet so that an edge thereof is in close and substantially continuous contact with a pair of mutually contacting face sheets on said two panels, and
    directing an electron beam along a line crossing through said contacting points of said panels and said sheet, and
    progressively and simultaneously welding said confronting pair of edges and said contacting edge by translationally moving said beam along a path coinciding therewith.

References Cited by the Examiner

UNITED STATES PATENTS

| | | | |
|---|---|---|---|
| 2,108,795 | 2/38 | Budd | 219—107 |
| 2,778,926 | 1/57 | Schneider | 219—117 |
| 2,932,720 | 4/60 | Stohr | 219—72 |
| 3,012,130 | 12/61 | Harrison | 219—137 |
| 3,151,231 | 9/64 | Steigerwald | 219—121 |

FOREIGN PATENTS

| | | |
|---|---|---|
| 571,618 | 8/45 | Great Britain. |
| 892,010 | 1/44 | France. |

RICHARD M. WOOD, *Primary Examiner.*